US008793193B2

(12) United States Patent
Sorotokin et al.

(10) Patent No.: US 8,793,193 B2
(45) Date of Patent: Jul. 29, 2014

(54) DIGITAL RIGHTS MANAGEMENT DISTRIBUTION SYSTEM

(75) Inventors: Peter Sorotokin, Cupertino, CA (US); Jim Lester, Dublin, CA (US); Nicholas Bogaty, Brooklyn, NY (US)

(73) Assignee: Adobe Systems Incorporated, San Jose, CA (US)

( * ) Notice: Subject to any disclaimer, the term of this patent is extended or adjusted under 35 U.S.C. 154(b) by 1053 days.

(21) Appl. No.: 12/207,185

(22) Filed: Sep. 9, 2008

(65) Prior Publication Data

US 2013/0124853 A1     May 16, 2013

(51) Int. Cl.
*G06F 21/00* (2013.01)

(52) U.S. Cl.
USPC ........... 705/59; 705/50; 705/51; 726/1; 726/2

(58) Field of Classification Search
USPC ........................................................... 705/59
See application file for complete search history.

(56) References Cited

U.S. PATENT DOCUMENTS

| 7,024,393 | B1* | 4/2006 | Peinado et al. | 705/59 |
| 7,263,497 | B1* | 8/2007 | Wiser et al. | 705/26 |
| 7,353,402 | B2* | 4/2008 | Bourne et al. | 713/193 |
| 7,389,270 | B2* | 6/2008 | Stefik et al. | 705/51 |
| 7,496,540 | B2* | 2/2009 | Irwin et al. | 705/59 |
| 2004/0059929 | A1* | 3/2004 | Rodgers et al. | 713/193 |
| 2004/0253942 | A1* | 12/2004 | Mowry et al. | 455/410 |
| 2005/0278259 | A1* | 12/2005 | Gunaseelan et al. | 705/59 |
| 2006/0235801 | A1* | 10/2006 | Strom et al. | 705/59 |
| 2007/0061594 | A1* | 3/2007 | Ginter et al. | 713/189 |
| 2007/0079121 | A1* | 4/2007 | Sekiguchi et al. | 713/168 |

OTHER PUBLICATIONS

Microsoft Windows Media—Architecture of Windows Media Rights Manager, http://www.microsoft.com/windows/windowsmedia/howto/articles/drmarchitecture.aspx, May 8, 2009, pp. 1-4.*
Microsoft Windows Media—Architecture of Windows Media Rights Manager, http://www.microsoft.com/windows/windowsmedia/howto/articles/drmarchitecture.aspx, website downloaded from the internet May 8, 2009, 4 pages.

* cited by examiner

*Primary Examiner* — Matthew Zimmerman
*Assistant Examiner* — Alexis Casey
(74) *Attorney, Agent, or Firm* — Wolfe-SBMC

(57) ABSTRACT

In an example embodiment, a digital content distributor may transmit an unsigned license associated with a protected digital object to a digital rights management provider. The digital rights management provider may digitally sign the license and may transmit the signed license to the digital content distributor.

8 Claims, 5 Drawing Sheets

DIGITAL RIGHTS MANAGEMENT DISTRIBUTION SYSTEM

FIELD

Subject matter disclosed herein may relate to a distribution system and method for digital rights management.

BACKGROUND

With networks such as the Internet gaining tremendous popularity, more and more digital media content may be made available for download by users from a vast array of sources. To protect intellectual property rights, content producers and/or distributors may employ some sort of digital rights management (DRM) scheme to protect digital media. Typically, if a user downloads protected content, the user may also acquire a license that includes a key to unlock the protected content before the content becomes readable, viewable, or playable. Digital rights management schemes may typically be classified as either "distributed" or "centralized" solutions. For distributed schemes, a DRM provider supplies a DRM solution to any of a number of content producers and/or distributors who may issue licenses to any number of users. In this case, the DRM provider has no involvement beyond the initial supplying of the DRM solution. In contrast, for centralized schemes, the DRM provider may not only supply the DRM solution, but may also serve as the sole content distributor and as the sole issuer of licenses to users.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
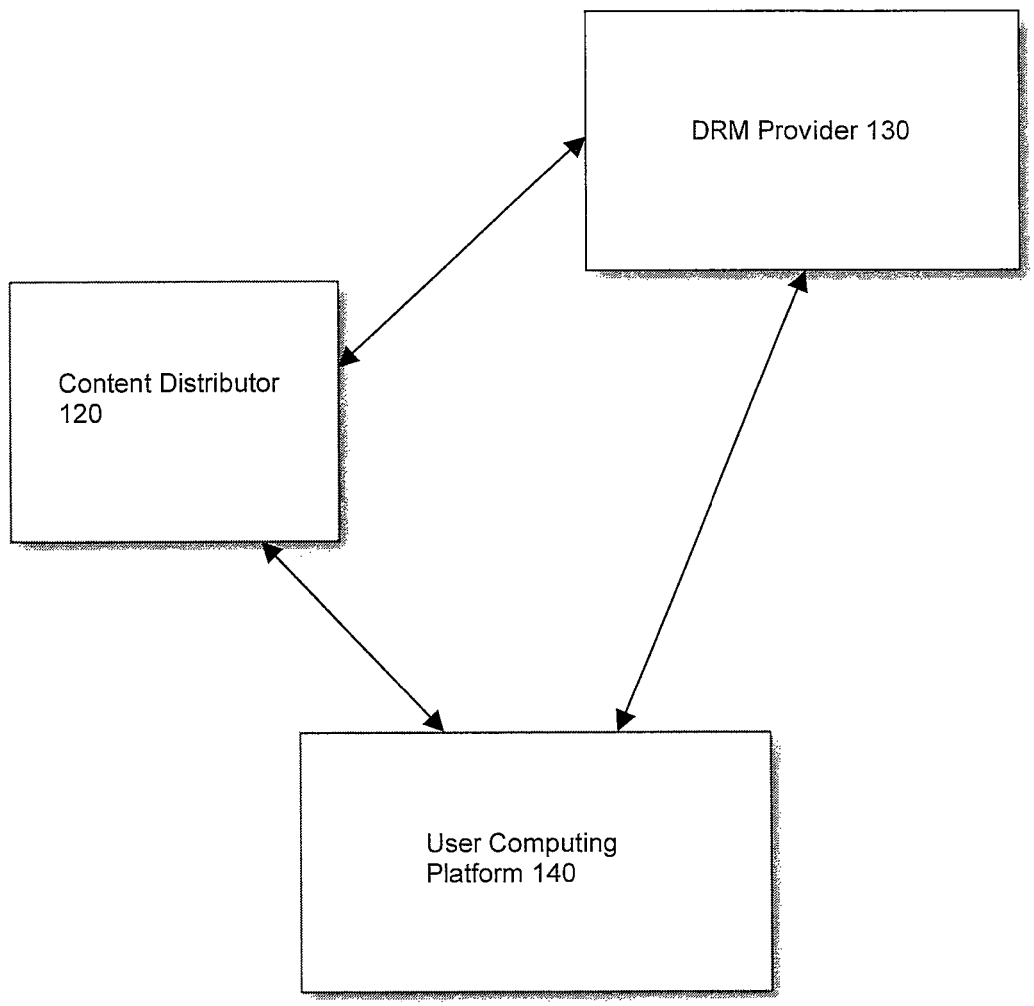
FIG. 1 is a block diagram of an example system including a DRM provider and a content distributor.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description which follow are presented in terms of algorithms or symbolic representations of operations on data bits or binary digital signals stored within a computing platform memory, such as a computer memory. These algorithmic descriptions or representations are examples of techniques used by those of ordinary skill in the data processing arts to convey the substance of their work to others skilled in the art. An algorithm here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform. Further, unless specifically stated otherwise, processes described herein, with reference to flow diagrams or otherwise, may also be executed and/or controlled, in whole or in part, by such a computing platform.

As discussed above, to protect intellectual property rights, content producers and/or distributors may employ some sort of digital rights management (DRM) scheme to protect digital media. A user may download protected content, and the user may also acquire a license that includes a key to unlock the protected content before the content becomes readable, viewable, or playable. As also described above, at least some DRM schemes may be classified as either "distributed" or "centralized" solutions. For distributed schemes, a DRM provider supplies a DRM solution to any of a number of content producers and/or distributors who may issue licenses to any number of users. In this case, the DRM provider has little or no involvement beyond the initial supplying of the DRM solution. In contrast, for centralized schemes, the DRM provider may not only supply the DRM solution, but may also serve as the sole content distributor and as the sole issuer of licenses to users. Each approach may provide benefits and disadvantages. For example, a centralized solution may allow the DRM provider to have complete control over license and content distribution. However, this approach may have the disadvantage of discouraging other content producers or distributors from participating in the centralized scheme. Content producers and distributors may be more likely to participate in distributed solutions, but, as previously mentioned, such a solution may not allow the DRM provider to be involved beyond supplying the initial DRM solution.

Embodiments described herein may comprise solutions that may provide for continuing involvement on the part of the DRM provider in the licensing process, and may also provide for the participation of any number of content distributors and/or content providers. In one or more embodiments, at least in part in response to receiving a license request from a user, a content distributor may deliver an unsigned license to a DRM provider, and the DRM provider may return a signed license to the content distributor. The content distributor may fulfill the user's license request by transmitting the signed license to the user's computing platform, and the user's computing platform may read or otherwise access a protected digital object according to permissions included in the license. In this manner, the DRM provider may be involved in each license grant, allowing an amount of continuing control over the licensing process, while allowing participation of any number of content distributors.

FIG. 1 is a block diagram of an example system including a DRM provider 130 and a content distributor 120. Content distributor 120 may comprise, for an example embodiment, a web server upon which may be stored one or more digital objects available for download by users via a network such as, for example, the Internet. For example, a user computing platform 140 may download a digital object from content distributor 120. In one or more embodiments, the digital object may be encrypted or otherwise protected, such that the user computing platform may read or otherwise access the protected digital object only through the use of a license obtained from the content distributor.

DRM provider 130 for one or more embodiments may supply a digital object reader application to user computing platform 140. The reader application may determine whether an appropriate license has been obtained before allowing the user to view or otherwise utilize the protected digital object. Content distributor 120 may, for one or more embodiments, be responsible for receiving license requests from user computing platform 140, and for transmitting licenses to the user computing platform.

For one or more embodiments, content distributor 120 may transmit an unsigned license to DRM provider 130. DRM provider 130 may sign the license, and may transmit the signed license to content distributor 120. Content distributor 120 may transmit the signed license to user computing platform 140. As used herein, the term "license" is meant to include any information pertaining to the rights that may govern the use of a digital object. A license may also include a key used to unlock a protected digital object, for some embodiments. For example, a license may include a key that may be used to decrypt an encrypted digital object, for an embodiment.

For an embodiment, a license may include information identifying a digital object, information identifying a user, and/or information pertaining to permissions to be granted to the user. For an embodiment, information identifying the digital object may comprise a code associated with the digital object by content distributor 120 so that DRM provider 130 is not able to determine which digital object is being accessed by the user. For example, if the digital object is an electronic book, an alphanumeric code may be assigned to the book and used to identify the book in the license transmitted to the DRM provider. The DRM provider for this embodiment is not aware of the association between the assigned code and the title of the electronic book, and therefore the DRM provider is not able to determine the title of the book being requested by the user. Of course, these are merely examples of the types of information that may be included in a license, and the scope of claimed subject matter is not limited in these respects.

As previously mentioned, DRM provider 130 may sign the license presented to the DRM provider by content distributor 120. For one or more embodiments, DRM provider 130 may apply a digital signature to the license. A digital signature may allow the reader application, executed on the user computing platform, to authenticate the source of the license. As used herein, the term "digital signature" is meant to include any element of a document that may provide for authentication of the document. For one or more embodiments, a digital signature may comprise cryptographic elements, although the scope of claimed subject matter is not limited in this respect. For example, a digital signature may, for an embodiment, comprise a string of text identifying the DRM provider. For one example embodiment, a hash function may be applied to the document to generate a document fingerprint. The fingerprint may be encrypted using a private key to generate a signed fingerprint. The digital signature element may comprise the signed fingerprint and a public key corresponding to the private key. For one or more embodiments, the digital signature object may be embedded inside the document. User computing platform 140 may, for one embodiment, calculate the fingerprint, and may compare the calculated fingerprint with results obtained by decrypting the signed fingerprint using the public key. If the calculated fingerprint matches the original fingerprint obtained by decrypting the signed fingerprint with the public key, the document may be considered to be authenticated. Of course, this is merely one example of a digital signature and authentication algorithm, and the scope of claimed subject matter is not limited in these respects. Example digital signature algorithms that may be utilized in one or more embodiments may include, but are not limited to, a Full Domain Hash or an RSA-PSS (RSA Probabilistic Signature Scheme) algorithm, to name but a couple of possibilities. Various embodiments may include any of a wide range of possible digital signature techniques, and the scope of claimed subject matter is not limited in this respect. For one or more embodiments, the term "signed license" refers to an electronic license document to which a digital signature has been applied. Similarly, the term "unsigned license" refers to an electronic license document to which a digital signature has not been applied.

A "digital object" as referred to herein relates to information that is organized and/or formatted in a digitized form. For example, a digital object may comprise one or more documents, visual media and/or audio media, and/or combinations thereof. Examples of digital objects may include movies and music, as well as electronic books. However, these are merely examples of the types of information that may be maintained in a digital object, and the scope of the claimed subject matter is not limited in this respect. Such a digital object may be maintained in a compressed format to enable efficient storage of the digital object in a storage medium and/or transmission of the digital object in a data transmission network. In one or more embodiments, a digital object may be protected. For example, a digital object may be encrypted in an effort to prevent unauthorized use. As described above, a protected digital object may be read or otherwise accessed through the use of a key that may be included in a license. For example, a key may allow for the decryption of an encrypted digital object. Digital objects may be distributed via disc or other media, or may be distributed via a network such as the Internet. However, these are merely examples of digital objects, and the scope of the claimed subject matter is not limited in these respects.

Figure 2:
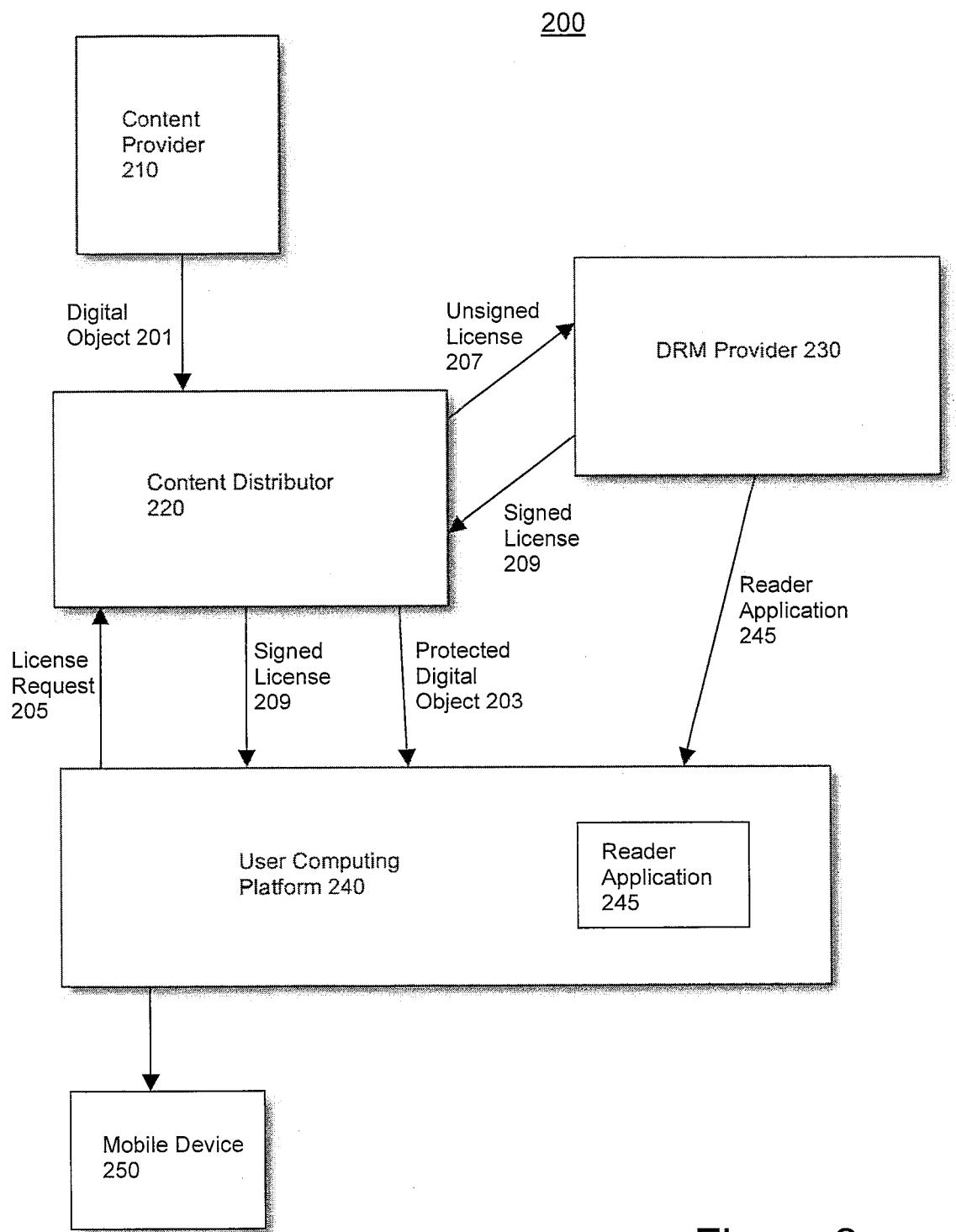
FIG. 2 is an illustration depicting an example DRM system in accordance with one or more embodiments.

FIG. 2 is an illustration depicting an example digital content distribution system 200 incorporating an example DRM embodiment. For this example, a content provider 210 may produce electronic books. Of course, an electronic book is merely one example of a digital object type, and the scope of claimed subject matter is not limited in this respect. Other possible digital object types may include, but are not limited to, movies, music, television shows, photographs, documents, etc. For this example embodiment, content provider 210 may provide a digital object 101 to a content distributor 220. Although the present example describes a single content distributor, other embodiments are possible where content provider 210 supplies digital object 101 to any number of content distributors. Also, for one or more embodiments, content distributor 220 and content provider 210 may comprise the same entity. That is, a single entity may serve as both a content provider and a content distributor. Of course, the scope of claimed subject matter is not limited in this respect. Further, for one or more embodiments, digital object 101 may comprise an electronic book, although the scope of claimed subject matter is not limited in this respect.

System 200 for this example embodiment also comprises a user computing platform 240. User computing platform 240 for this example may comprise a desktop computer system, although the scope of claimed subject matter is not limited in this respect. Other embodiments of a user computing platform may comprise a notebook computer, a personal digital assistant, a cellular phone, a portable music player, a game console, and/or any other computing platform. Also for one or more embodiments, a mobile device 250 may be coupled at least periodically to user computing platform 240. Mobile device 250 may comprise a personal navigation device, a cellular telephone, a personal digital assistant, a portable music player, etc., although the scope of claimed subject matter is not limited in this respect. Mobile device 250 is discussed more fully below.

For one or more embodiments, a DRM provider 230 may provide a reader application 245 to user computing platform 240. The reader application may comprise instructions stored in a storage medium that, if executed, enable user computing platform 240 to view or otherwise access digital objects. For example, reader application 245 may comprise an electronic book viewer. For another example, reader application 245 may comprise a video and audio player that may be used, for example, to watch movies or to listen to music. Of course, these are merely examples of possible reader applications, and the scope of claimed subject matter is not limited in these respects.

As mentioned above, in one or more embodiments reader application 245 may be supplied by DRM provider 230. In an embodiment, the user may download the reader application from a website hosted by the DRM provider, and DRM provider 230 may maintain records of users and/or the user's computing platforms that have received copies of the reader application, although the scope of claimed subject matter is not limited in these respects. Reader application 245 may play a role in the DRM embodiment, in that the reader application is responsible for checking licenses to ensure authenticity before allowing the user computing platform to access protected digital objects, as discussed more fully below.

For one example of a series of transactions demonstrating the present DRM embodiment, consider the following, as a user begins the process by downloading a protected digital object 203 from content distributor 220. For this example, protected digital object 203 is assumed to be an electronic book. However, the scope of claimed subject matter is not limited in this respect. Without a license, reader application 245 may not allow the user to view the book. Therefore, the user may transmit a license request 205. For one or more embodiments, the license request is received by content distributor 220. At least in part in response to receiving the license request, content distributor 220 may generate a license 207. For one or more embodiments, generated license 207 may include a code identifying the title of the electronic book, information identifying the content distributor, and a listing of permissions to be granted to the user computing platform and/or to the user. The license may also include a key that may be utilized to unlock the protected digital object. For example, the key may allow user computing platform 240 to decrypt an encrypted digital object. For one or more embodiments, the license may comprise a text file written in an Extensible Markup Language (XML) format, although the scope of claimed subject matter is not limited in this respect.

Content distributor 220 may transmit the generated, but as yet unsigned, license 207 to DRM provider 230. DRM provider 230 may inspect the contents of license 207, and may apply a digital signature to the license, thereby creating a signed license 209. The scope of claimed subject matter is not limited to any particular type or technique of digital signature. DRM provider 230 may take note of which user and/or user computing platform is requesting the license, and may also take note of the code identifying the title of the digital object. However, as discussed previously, in one or more embodiments the DRM provider is not provided with an actual title name of the digital object, but is instead provided a code assigned to the digital object by content distributor 220 in order to prevent DRM provider 230 from learning the actual title of the digital object, which, in this case, is an electronic book. In other embodiments, DRM provider 230 may be provided with the actual title of the electronic book. DRM provider 230 may also track which content distributor is requesting the signed license. In this manner, DRM provider 230 is involved in each license issuance process, may track various information related to the licenses, as noted above, and may thereby maintain an amount of control over the licensing process while allowing for any number of content distributors.

In one or more embodiments, DRM provider 230 may transmit signed license 209 to content distributor 220, and content distributor 220 may transmit the signed license to user computing platform 240. Reader application 245 may inspect the digital signature to ensure the license's authenticity, and may allow the user to view the electronic book via a display device for the user computing platform if the license is determined to be authentic. For one or more embodiments, reader application 245 may utilize a key included in the license to unlock the protected digital object. Also, in an embodiment, the digital object may be transferred to mobile device 250 for viewing by the user.

Figure 3:
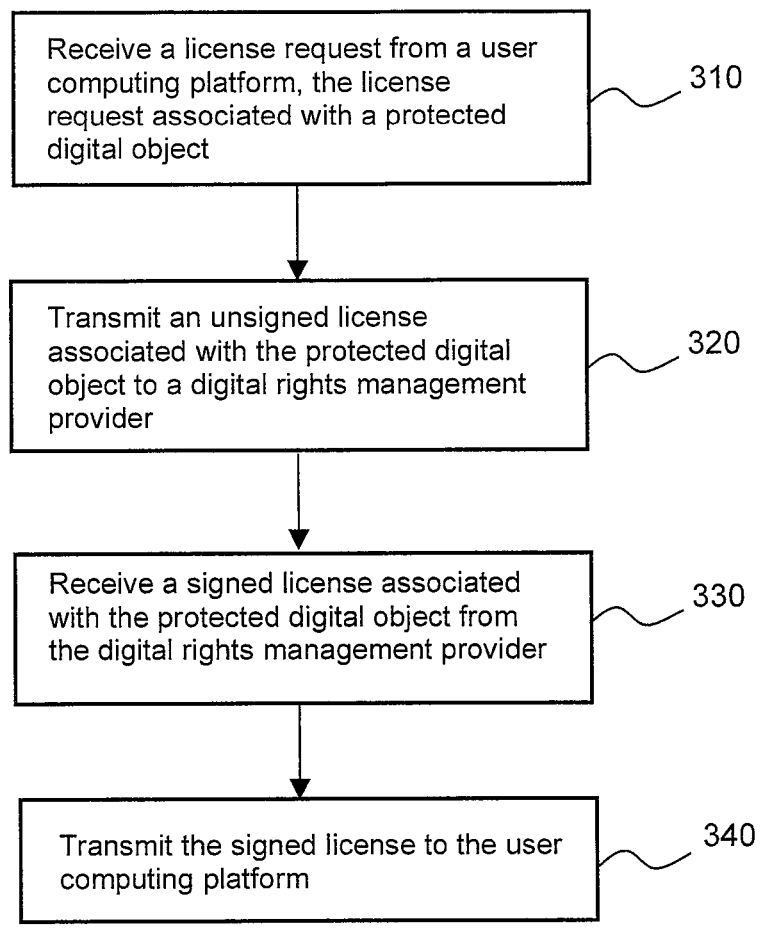
FIG. 3 is a flow diagram of an example embodiment of a method for digital rights management.

FIG. 3 is a flow diagram of an example embodiment of a method for digital rights management. At block 310, a license request may be received from a user computing platform. For the present example embodiment, the license request may be received at a content distributor, although the scope of claimed subject matter is not limited in this respect. The license request may be associated with a protected digital object. As mentioned previously, digital objects may include any of a wide range of content types, such as, for example, electronic books, movies, music, etc. For the present embodiment, the digital object may comprise an electronic book. Of course, the scope of claimed subject matter is not limited in these respects. Further, the license request is mentioned herein as being associated with a particular computing platform, but other embodiments are possible where the license request is associated with the user in addition to or in place of the computing platform. Still other embodiments may associate a license request with a number of users and/or computing platforms.

At block 320, an unsigned license may be transmitted to a digital rights management (DRM) provider. The DRM provider may inspect the unsigned license, and may digitally sign the license to produce a signed license, as described above in connection with FIG. 2. Embodiments in accordance with claimed subject matter may utilize any of a wide range of techniques for generating digital signatures. At block 330, the signed license may be received, for this example embodiment by the content distributor, and the signed license may be transmitted to the user computing platform at block 340 by the content distributor. Embodiments in accordance with claimed subject matter may include all, less than, or more than blocks 310 through 340. Further, the order of blocks 310 through 340 is merely an example order, and the scope of claimed subject matter is not limited in this respect.

Figure 4:
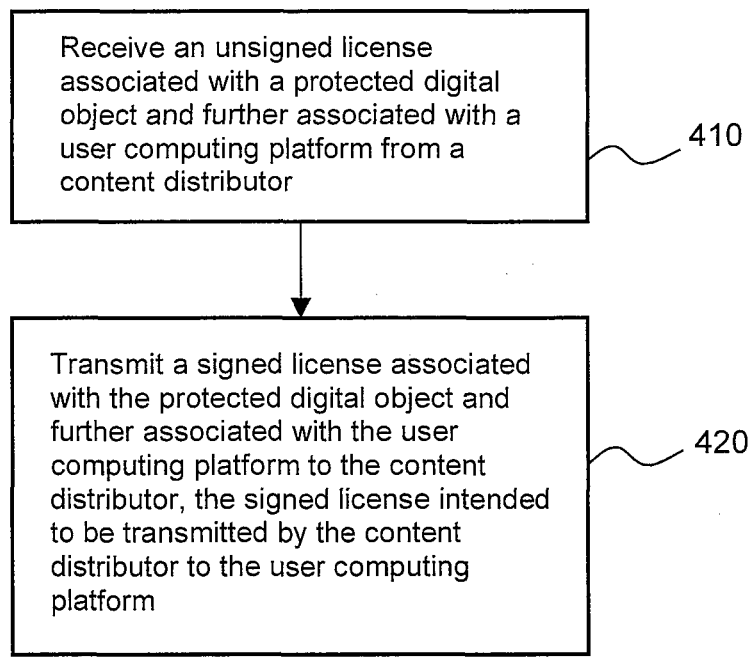
FIG. 4 is a flow diagram of an example embodiment of a method for digital rights management.

FIG. 4 is a flow diagram of an example embodiment of a method for digital rights management. At block 410, an unsigned license associated with a protected digital object may be received. For an embodiment, the unsigned license may be transmitted by a content distributor and may be received at a DRM provider, and the license may further be associated with a user computing platform. For one or more embodiments, the license may be associated with one or more users, although the scope of claimed subject matter is not limited in these respects. Also for one or more embodiments, the unsigned license may include a code identifying the title of the digital object, information identifying a content distributor, and a listing of permissions to be granted to the user computing platform and/or to the user.

The unsigned license may also include a key that may be utilized by the user computing platform to unlock the protected digital object. For example, the key may allow the user computing platform to decrypt an encrypted digital object. For one or more embodiments, the unsigned license may comprise a text file written in the XML format, although the scope of claimed subject matter is not limited in this respect.

At block 420, a signed license associated with the protected digital object and further associated with the user computing platform may be transmitted to the content distributor. As described above, a DRM provider may utilize any of a wide range of possible techniques for applying a digital signature to the unsigned license, and the scope of claimed subject matter is not limited to any particular technique. The signed license for an embodiment is intended to be transmitted by the digital object operator to the user computing platform. The user computing platform may utilize the license to view or otherwise access the protected digital content, as described previously. Embodiments in accordance with claimed subject matter may include all of, less than, or more than blocks 410 and 420. Also, the order of the block is merely an example order, and the scope of claimed subject matter is not limited in this respect.

Figure 5:
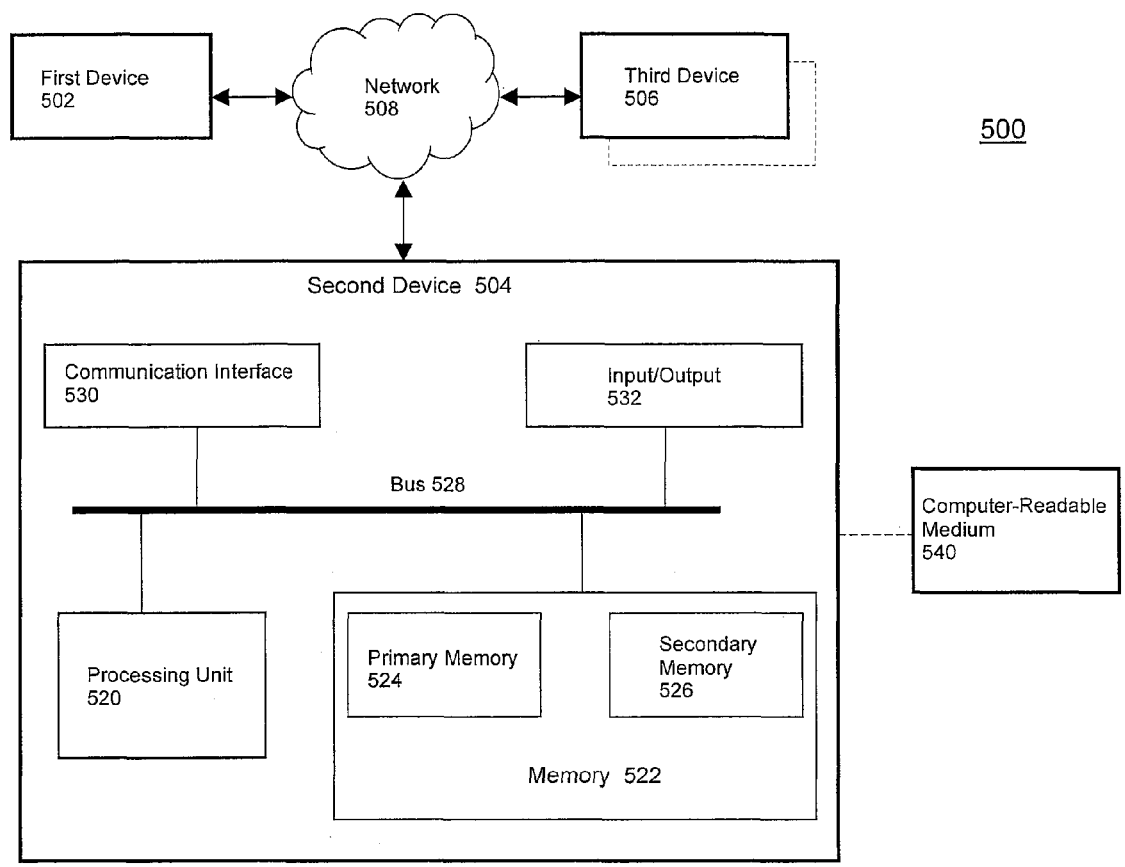
FIG. 5 is a block diagram illustrating an example system comprising a plurality of computing devices coupled via a network in accordance with one or more embodiments.

FIG. 5 is a schematic diagram illustrating an exemplary embodiment of a computing environment system 500 that may include one or more devices configurable to implement techniques and/or processes described above in connection with user computing platforms, content distributors, content providers, DRM providers, and mobile devices discussed above in connection with FIGS. 1-4, for example. System 500 may include, for example, a first device 502, a second device 504, and a third device 506, which may be operatively coupled together through a network 508.

First device 502, second device 504 and third device 506, as shown in FIG. 5, may be representative of any device, appliance or machine that may be configurable to exchange data over network 508. By way of example but not limitation, any of first device 502, second device 504, or third device 506 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. Any of the first, second, and third devices 502, 504, and 506, respectively, may comprise one or more of a user computing platform, a content distributor, a digital object operator, a content provider, a DRM provider, and/or a mobile device in accordance with the example embodiments described herein.

Similarly, network 508, as shown in FIG. 5, is representative of one or more communication links, processes, and/or resources configurable to support the exchange of data between at least two of first device 502, second device 504, and third device 506. By way of example but not limitation, network 508 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 506, there may be additional like devices operatively coupled to network 508.

It is recognized that all or part of the various devices and networks shown in system 500, and the processes and methods as further described herein, may be implemented using or otherwise include hardware, firmware, software, or any combination thereof.

Thus, by way of example but not limitation, second device 504 may include at least one processing unit 520 that is operatively coupled to a memory 522 through a bus 528.

Processing unit 520 is representative of one or more circuits configurable to perform at least a portion of a data computing procedure or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any data storage mechanism. Memory 522 may include, for example, a primary memory 524 and/or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory and/or one or more data storage devices or systems, such as, for example, a disk drive, an optical disc drive, a tape drive, a solid state memory drive, etc: In certain implementations, secondary memory 526 may be operatively receptive of, or otherwise configurable to couple to, a computer-readable medium 540. Computer-readable medium 540 may include, for example, any medium that can carry and/or make accessible data, code and/or instructions for one or more of the devices in system 500. Computer readable medium 540 may also be referred to as a storage medium.

Second device 504 may include, for example, a communication interface 530 that provides for or otherwise supports the operative coupling of second device 504 to at least network 508. By way of example but not limitation, communication interface 530 may include a network interface device or card, a modem, a router, a switch, a transceiver, and the like.

Second device 504 may include, for example, an input/output 532. Input/output 532 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 532 may include an operatively configured display, speaker, keyboard, mouse, trackball, touch screen, data port, etc.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the descriptions herein.

Embodiments disclosed herein may be implemented in hardware, such as implemented to operate on a device or combination of devices, whereas another embodiment may be implemented in software. Likewise, an embodiment may be implemented in firmware, or as any combination of hardware, software, and/or firmware, for example.

Likewise, although the scope of claimed subject matter is not limited in this respect, one embodiment may comprise one or more articles, such as a storage medium or storage media. This storage media may have stored thereon instructions that if executed by a computing platform, such as a computer, a computing system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript and/or PHP objects. However, these are merely examples of an instruction, and the scope of claimed subject matter is not limited in this respect.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
    performing by one or more computers of a digital rights management provider:
        providing an executable application to a user computing platform implemented on a computer system different than said one or more computers;
        receiving an unsigned license associated with a protected digital object and further associated with a user computing platform from a content distributor, wherein the protected digital object is provided to the user computing platform by the content distributor, wherein the content distributor controls none of said one or more computers or said different computer system and the executable application provided to the user computing platform is configured to read the protected digital object contingent upon the signed license being received by the user computing platform; and
        providing to the content distributor, a signed license associated with the protected digital object and destined for the executable application of the user computing platform.

2. The method of claim 1, the unsigned license comprising information identifying the user computing platform and an identification value associated with the protected digital object.

3. The method of claim 2, the identification value associated with the digital object to not include a title of the digital object to prevent an association of the title with the user computing platform.

4. The method of claim 1, the signed license comprising information identifying the user computing platform, information identifying the digital object, and a digital signature.

5. An article, comprising: a non-transitory storage medium having stored thereon instructions that, when executed on one or more computers of a digital rights management provider, are configured to:
    provide an executable application to a user computing platform implemented on a computer system different than said one or more computers, the executable application provided to the user computing platform is configured to read the protected digital object contingent upon the signed license being received by the user computing platform;
    receive an unsigned license associated with a protected digital object and further associated with a user computing platform from a content distributor, wherein the protected digital object is provided to the user computing platform by the content distributor, wherein the content distributor controls none of said one or more computers or said different computer system; and
    provide to the content distributor, a signed license associated with the protected digital object and destined for the executable application of the user computing platform.

6. The article of claim 5, the unsigned license comprising information identifying the user computing platform and an identification value associated with the protected digital object.

7. The article of claim 6, the identification value associated with the digital object to not include a title of the digital object to prevent an association of the title with the user computing platform.

8. The article of claim 1, the signed license comprising information identifying the user computing platform, information identifying the digital object, and a digital signature.

* * * * *

UNITED STATES PATENT AND TRADEMARK OFFICE
CERTIFICATE OF CORRECTION

| | |
|---|---|
| PATENT NO. | : 8,793,193 B2 |
| APPLICATION NO. | : 12/207185 |
| DATED | : July 29, 2014 |
| INVENTOR(S) | : Sorotokin et al. |

Page 1 of 1

It is certified that error appears in the above-identified patent and that said Letters Patent is hereby corrected as shown below:

In the Claims:

Column 12, line 45, after "...claim", delete "1", insert -- 5 --, therefor.

Signed and Sealed this
Eighteenth Day of November, 2014

Michelle K. Lee
*Deputy Director of the United States Patent and Trademark Office*